Jan. 13, 1925.
A. GROULEFF ET AL
ELECTRIC TOASTER
Filed Dec. 26, 1922
1,522,818
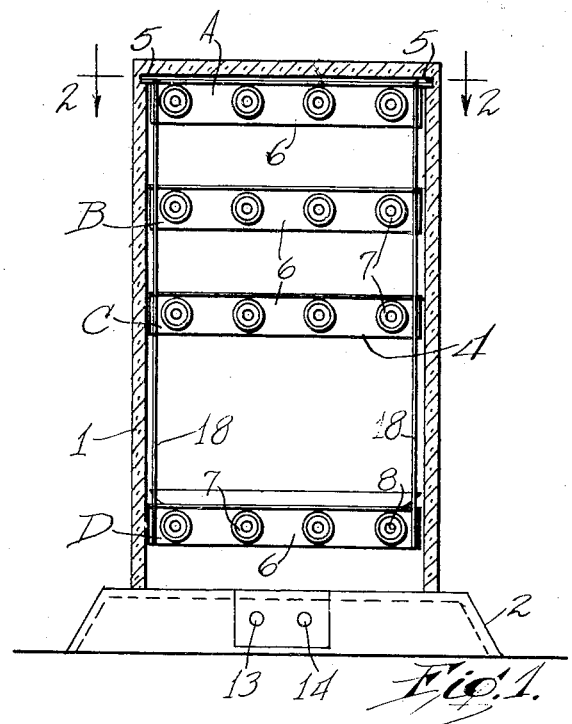
Fig. 1.
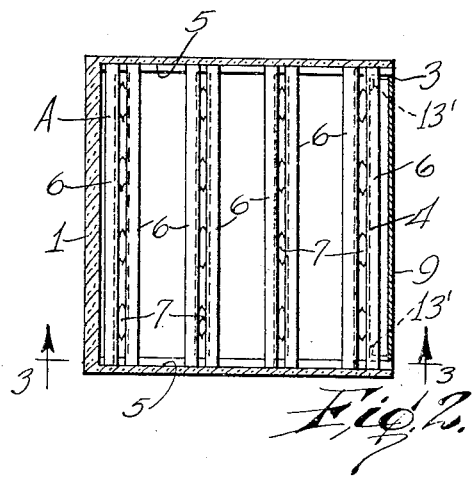
Fig. 2.
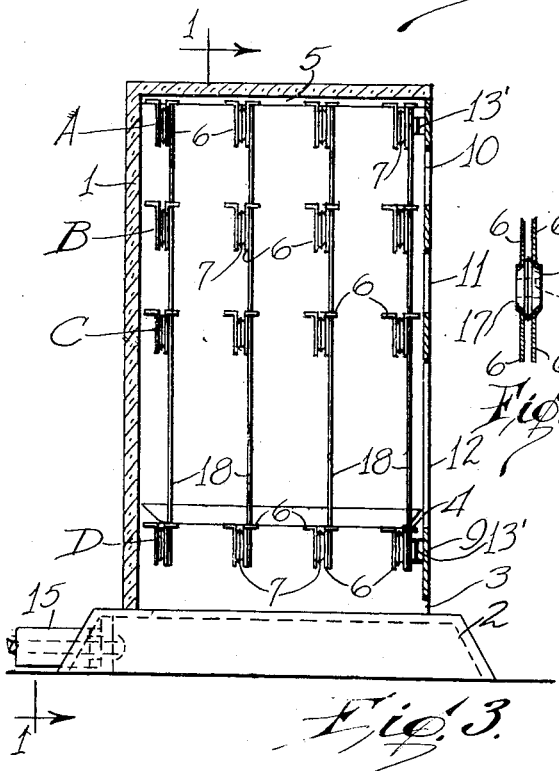
Fig. 3.
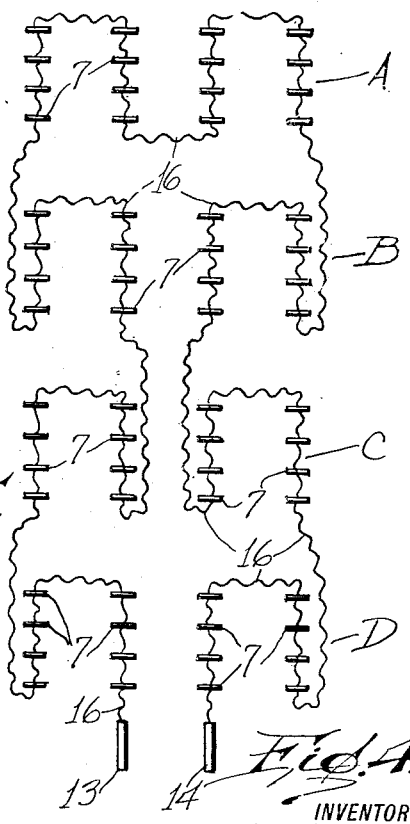
Fig. 4.
Fig. 5.
INVENTORS
A. Grouleff
H. A. Holmes
BY Munn &co
ATTORNEYS Patented Jan. 13, 1925.

1,522,818

UNITED STATES PATENT OFFICE.

AAGE GROULEFF AND HAROLD A. HOLMES, OF CHICAGO, ILLINOIS.

ELECTRIC TOASTER.

Application filed December 26, 1922. Serial No. 609,027.

*To all whom it may concern:*

Be it known that we, AAGE GROULEFF, a citizen of the United States, and a resident of Chicago, in the county of Cook and State of Illinois, and HAROLD A. HOLMES, a subject of the King of Denmark, and a resident of Chicago, in the county of Cook and State of Illinois, have invented a new and useful Improvement in Electric Toasters, of which the following is a full, clear, and exact description.

Our invention relates to improvements in electric toasters and it consists in the combinations, constructions, and arrangements herein described and claimed.

An object of our invention is to provide an electric toaster in which the casing is made of a non-metallic material such as porcelain, clay, "Pyrex" or any other non-metallic material.

A further object of our invention is to provide a device of the type described in which the frame entirely encloses the article being toasted, thereby retaining most of the heat that is generated by the heating element.

A further object of our invention is to provide a device of the type described in which insulating means for insulating the heating element from the frame is not necessary, since the frame itself is made of an insulating material.

A further object of our invention is to provide a device of the type described in which the heating element consists of a single unit which may be disposed in the frame or be removed therefrom at wall.

A further object of our invention is to provide a device of the type described in which the frame may be thoroughly cleaned when the heating element is removed.

A further object of our invention is to provide a device of the type described in which the articles are heated on both sides.

A further object of our invention is to provide a device of the type described which is simple in construction, durable and efficient for the purpose intended, and which is not likely to easily get out of order.

Other objects and advantages will appear in the following specification, and the novel features of the invention will be particularly pointed out in the appended claims.

Our invention is illustrated in the accompanying drawings forming part of this invention, in which—

Figure 1 is a section along the line 1—1 of Figure 3,

Figure 2 is a section along the line 2—2 of Figure 1,

Figure 3 is a section along the line 3—3 of Figure 2,

Figure 4 is a wiring diagram of the electrical circuit, and

Figure 5 is an enlarged sectional detail portion of the device.

In carrying out our invention we provide a casing 1 which in the present form of device is shown as being prism-like in shape. The casing 1 is supported by a base 2 which is integral therewith. The casing 1 and the base 2 are made of an insulating material such as porcelain, clay, "Pyrex," or any other like non-metallic material. It will therefore be noted from this construction that the heating element may be carried directly by the casing, and not be insulated therefrom as is customary with the ordinary toasters or their heating apparatus. This saving in insulating means results in a saving in the manufacture of the device, whereby the device may be manufactured at a relatively small expense.

The casing 1 is open at one of its sides such as at 3, and is adapted to receive a heating element indicated generally at 4. The heating element is carried by lugs which are received in two horizontally disposed grooves 5 that are disposed adjacent to the top of the casing 1. The heating element 4 consists of a plurality of angle irons 6 which are disposed in different groups. The top group of angle irons have their horizontal faces projecting slightly beyond their vertical sides, these projections constituting lugs which are slidably received in grooves 5. The angle irons are disposed in pairs with their upper sides facing away from each other, (see Figure 3). The adjacent vertical sides of the angle irons are separated from each other by insulating bushings 7. The bushings 7 have bores 8 therein through which the heating wire 9 is disposed. It will be noted from Fig. 3 that the upper set A of angle irons 6 are disposed adjacent to the top of the casing 1, that another set B is spaced below the set A, and that a third set C is spaced below the set B, and that a fourth set D is spaced below the set C. The sets A, B, and C are spaced far enough apart to readily receive a slice of bread therebetween. A larger space is provided between the sets C and D so as to provide a compartment which may receive chops, or eggs, which are desired to be heated. The upper sides, i. e., the horizontal sides of the angle irons 6 provide supporting surfaces for the bread or other articles which are disposed within the casing 1 to be heated. The open side 3 of the casing 1 is closed by a partition 9. As clearly shown in Figure 3, the partition 9 is provided with an opening 10 which registers with a compartment formed by the sets A and B of angle irons, with an opening 11, which registers with a compartment formed by the sets B and C, and with an opening 12 which registers with a compartment formed by the sets C and D. The partition 9 does not extend to the base 2, but provides an air opening between the bottom of the partition and the upper surface of the base. The partition 9 is rigidly secured to the heating element 4 by means of lugs 13', whereby the heating elements can be removed from the casing 1 as a unit when the partition 9 is removed.

In Figure 4 we have shown a diagrammatic view of the wiring which is employed in the present form of the device. It will be noted that a single wire extends from the terminal 13 through all of the sets A, B, C, and D, and back to the terminal 14. These terminals are adapted to be placed in electrical connection with a source of current by means of a plug 15. The heating wire 16 extends from the terminal 31, through half the bushings 7 in the set D, and in a like manner through half of the number of bushings 7 in the other sets C, B, and A. The wire in the set A extends through all of the bushings 7. From this place, the wire extends through the sets B, C, and D, and is carried by the other half of the number of bushings in these sets. Figure 4 clearly illustrates the path the wire takes through the various sets. The portion of the wire extending from the set D is then secured to the terminal 14 and completes the circuit through the device.

From the foregoing description of the various parts of the device, the operation thereof may be readily understood. The angle irons 6 have openings 17 therein which receive the bushings 7 and hold the bushings in place. The angle irons disposed in the sets B, C, and D, are not provided with lugs as are the angle irons in the set A. The angle irons B, C, and D, are carried by the angle irons in the set A by means of vertically extending wires 18. The wires 18 are secured to the angle irons 6 by spot welding, or by any other attaching means. In this manner all of the angle irons in the heating element are held in position and provide a heating element which can be moved around as a single unit. The lowermost set of angle irons 6 is spaced above the base 2.

When using the device, the plug 15 is connected to the terminals 13 and 14 and with a source of current not shown. The current will now travel through all of the sets A, B, C, and D, and will cause the wire 16 which is carried by these sets to become red hot. A slice of bread may be disposed in each of the openings 10 and 11 and will be toasted on both sides at the same time by means of the heated wire that is carried by the sets A, B, and C. If desired, other articles such as meat chops, eggs, or like food, may be warmed or toasted in the compartment formed by the sets C and D. If it is desired to clean the device, it is merely necessary to move the partition 9 from the casing 1, the partition in turn carrying the heating element. It is obvious that the casing 1 may be readily cleaned with the heating element removed therefrom. This is a distinct advantage over the ordinary toasters. The device is simple in operation, and is not likely to get out of order easily. In case the heating element should burn out, it is not necessary to buy an entire new device, but it is merely necessary to purchase a new heating element. The device is relatively simple in construction and can be manufactured at a relatively small expense.

We claim:

1. In a device of the type described, a casing made of a non-metallic material, a heating element removably carried by said casing, said heating element consisting of a plurality of wire supporting angle irons having one of their sides disposed in a horizontal plane, bushings carried by said angle irons, a heating wire carried by said bushings, said casing having a groove therein adapted to receive and support the uppermost set of angle irons, and supporting wires connecting said angle irons together as a unit.

2. A device of the type described comprising a casing having three side walls and a top and bottom wall, of a heating element removably carried by said casing and being adapted to heat articles disposed in said casing on the top and bottom of the article, and a plate secured to said heating element, said plate being adapted to enclose the open side of said casing.

3. An electric toaster comprising a casing adapted to inclose the food, and a heating element removably carried by said casing for heating the food.

4. An electric toaster comprising a casing adapted to inclose the food, and a heating element removably carried by said casing for heating the food in said casing on both sides thereof.

5. In an electric toaster, a heating element comprising a heating wire, and means for carrying said wires and for supporting articles of food, said means disposing the wire above and below the articles of food whereby the food is heated on the top and bottom thereof.

6. In an electric toaster, a heating element comprising a plurality of angle irons, said angle irons being disposed in different planes so as to support the various articles of foods, and a heating wire carried by said angle irons.

AAGE GROULEFF.
HAROLD A. HOLMES.